(No Model.)

W. L. LANGLEY.
PICKER STEM FOR COTTON HARVESTERS.

No. 382,536. Patented May 8, 1888.

WITNESSES:
A. E. Eader
John E. Morris

INVENTOR:
Wm L. Langley
BY Chas B. Mann
ATTORNEY.

UNITED STATES PATENT OFFICE.

WILLIAM L. LANGLEY, OF NEWARK, NEW JERSEY, ASSIGNOR TO THE LANGLEY COTTON HARVESTER COMPANY OF NEW YORK CITY.

PICKER-STEM FOR COTTON-HARVESTERS.

SPECIFICATION forming part of Letters Patent No. 382,536, dated May 8, 1888.

Application filed May 19, 1887. Serial No. 238,732. (No model.)

*To all whom it may concern:*

Be it known that I, WILLIAM L. LANGLEY, a citizen of the United States, residing at Newark, in the county of Essex and State of New Jersey, have invented certain new and useful Improvements in Picker-Stems for Cotton-Harvesters, of which the following is a specification.

This invention relates to a picker-stem for picking cotton from the bolls on plants in the field. Stems of this character are used on machines which are mounted on wheels to be moved in the field along a row of cotton-plants.

The invention is illustrated in the accompanying drawings, in which—

Figure 1:
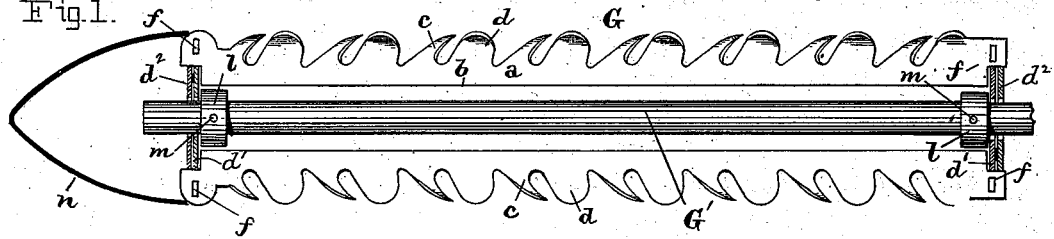
Figure 2:
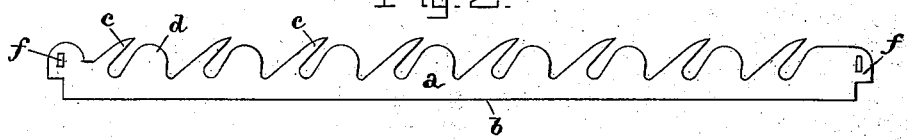
Figure 3:
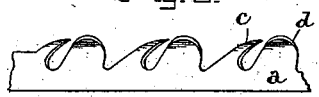
Figure 4:
Figure 5:
Figure 6:
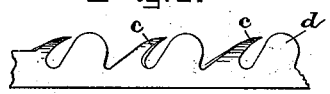
Figure 7:
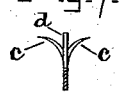
Figure 8:
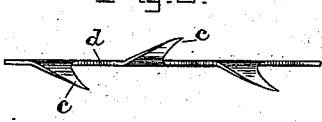
Figure 9:
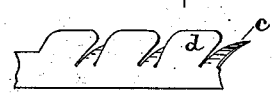
Figure 10:
Figure 11:
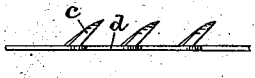
Figure 12:
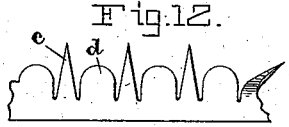
Figure 13:
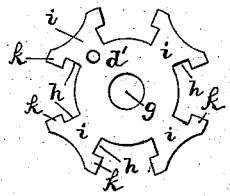
Figure 14:
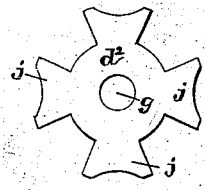
Figure 15:
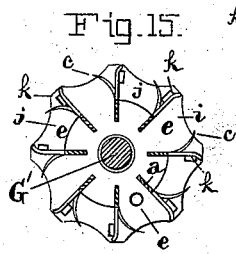

Figure 1 is a view of the picker stem, showing a longitudinal section. Fig. 2 is a view of one of the tooth and guard plates as it appears when first cut. Figs. 3, 4, and 5 show side, end, and top edge views, respectively, of a finished tooth and guard plate, the teeth of which are all inclined to one side. Figs. 6, 7, and 8 show side, end, and top edge views, respectively, of a finished tooth and guard plate, the teeth of which are inclined alternately to opposite sides—in other words, the teeth are "staggered." Figs. 9, 10, and 11 show side, end, and top edge views, respectively, of a modified form of tooth and guard plate. Fig. 12 shows a side view of another modification of the tooth and guard plate, one tooth only of which is bent and twisted to the position it is intended to have. Figs. 13 and 14 are views, separately, of the two end plates, which together serve to secure all the tooth-plates at one end of the stem-body. Fig. 15 is a cross-section of the finished picker-stem.

The letter $a$ designates a plate, of suitable sheet metal, having one edge, $b$, straight and smooth and the other edge provided with teeth $c$ and guards $d$, located alternately—that is to say, the plate is cut away to form a pointed tooth, $c$, then next to said tooth a rounded guard, $d$, and then again another pointed tooth, and following it a rounded guard, and so on along the entire plate. I prefer in cutting the plate to have the teeth longer than the guards and then to bend the teeth sidewise from the row of guards, so that they will be inclined. Thus the plate-strip of the picker-stem has one edge straight and the other edge provided with both teeth and guards located alternately. All the teeth may be inclined to one side circumferentially with respect to the axis of the stem, or they may all be inclined to one side and also pointed rearward, as shown. Thus two distinct kinds of inclination are contemplated. When all the teeth incline to one side, whether they also point rearward or not, the picker-stem body G thus provided is adapted to be revolved on the spindle G'. The teeth may be staggered or inclined to both sides—that is, every other tooth inclined to one side, and the alternate teeth inclined to the opposite side, and all inclined or pointed rearward. When thus arranged, the picker-stem body G is not adapted to be revolved. It will be seen that the teeth $c$ point outwardly toward the circumference and are also inclined to the radius. The teeth on each plate form a row lying in one plane, while the guards form a row lying in a different plane. A suitable number of these toothed plates—in the present instance eight—are secured together by end plates, $d'$ $d^2$, and form a body, G, comprising longitudinal tooth-plates and longitudinal slots or open spaces $e$ between the said plates. The construction of the end plates, $d'$ and $d^2$, is shown in Figs. 13 and 14. The end plate, $d'$, has a central hole, $g$, for the spindle G', and four radial tangs, $i$, each having two laterally-projecting ears, $k$, each ear $k$ of which forms a notch or recess, $h$, and the arms $k$ on the tangs fit into the slots $f$ in the ends of the tooth-plates.

In putting the tooth-plates and end plates together to form the picker-stem body the slotted ends of the tooth-plates are first placed in position on the ears $k$, and then the second end plate, $d^2$, which has four radial tangs, $j$, is placed against the first end plate, $d'$, and each of said tangs $j$ takes position between two of the ends of the tooth-plates and confines them on the ears $k$. The two end plates may then be secured together in any desired manner.

The stem-body G is mounted on the spindle G', whereon it may revolve freely, and is confined on the spindle by any suitable means. In the present instance two collars, $l$, one at each end, are secured to the spindle by pins $m$.

The end of the picker-stem body has a cone-shaped point, $n$, secured in any suitable manner.

Having described my invention, I claim and desire to secure by Letters Patent of the United States—

1. A cotton-picker stem having longitudinal plates which are provided along their outer edges with teeth and guards located alternately, as set forth.

2. A cotton-picker stem having longitudinal plates $a$ secured to end plates and arranged to form between each two longitudinal plates a longitudinal slot or open space, $e$, and said plates provided with teeth $c$ and guards $d$, located alternately along the same edge, as set forth.

3. A cotton-picker stem having longitudinal plates provided on one edge with alternating teeth and guards, the said teeth pointing outwardly toward the circumference of the stem and inclined to the radius thereof and at the same time inclined rearwardly.

4. A cotton-picker stem having longitudinal plates provided on one edge with teeth and guards, the said teeth inclining sidewise and differently from the guards, whereby the teeth form a longitudinal row lying in one plane and the guards a row lying in another plane.

5. A cotton-picker stem having longitudinal plates provided with teeth and guards, and having in their ends slots $f$, and secured together at said ends by two end plates, each having a central hole, $g$, one of said plates, $d$, being provided with radial tangs $i$, having laterally-projecting ears $k$, and the other plate, $d'$, being provided with tangs $j$, having radial edges, each laterally-projecting ear $k$ on one end plate occupying the end slot, $f$, of a longitudinal plate, and a radial tang, $j$, of the other plate lying between two of the longitudinal plates, and thereby confining them on the said laterally-projecting ears.

In testimony whereof I affix my signature in the presence of two witnesses.

WILLIAM L. LANGLEY.

Witnesses:
SYLVANUS COOPER,
ABRAM A. WHEATON.